(12) United States Patent
Van De Ven (10) Patent No.: US 7,969,097 B2
(45) Date of Patent: Jun. 28, 2011

(54) LIGHTING DEVICE WITH COLOR CONTROL, AND METHOD OF LIGHTING

(75) Inventor: Antony Paul Van De Ven, Hong Kong (HK)

(73) Assignee: Cree, Inc., Durham, NC (US)

( * ) Notice: Subject to any disclaimer, the term of this patent is extended or adjusted under 35 U.S.C. 154(b) by 974 days.

(21) Appl. No.: 11/755,149

(22) Filed: May 30, 2007

(65) Prior Publication Data

US 2007/0278974 A1    Dec. 6, 2007

Related U.S. Application Data (60) Provisional application No. 60/809,461, filed on May 31, 2006.

(51) Int. Cl.
     *H05J 13/32*      (2006.01)
     *G05F 1/00*      (2006.01)
     *H05F 37/00*      (2006.01)

(52) U.S. Cl. .................. 315/112; 315/309; 315/312

(58) Field of Classification Search ............. 315/307, 315/291, 312, 113, 114, 115, 116, 117, 309; 362/227, 230, 231

See application file for complete search history.

(56) References Cited

U.S. PATENT DOCUMENTS

| | | | |
|---|---|---|---|
| 3,927,290 A | 12/1975 | Denley | |
| 4,329,625 A | 5/1982 | Nishizawa et al. | |
| 5,264,997 A | 11/1993 | Hutchisson et al. | |
| 5,767,837 A | 6/1998 | Hara | |
| 5,783,909 A | 7/1998 | Hochstein | |
| 5,803,579 A | 9/1998 | Turnbull et al. | |
| 5,851,063 A | 12/1998 | Doughty et al. | |
| 5,926,238 A | 7/1999 | Inoue | |
| 5,959,316 A | 9/1999 | Lowery | |
| 6,069,676 A | 5/2000 | Yuyama | |
| 6,078,148 A | 6/2000 | Hochstein | |
| 6,095,666 A | 8/2000 | Salam | |
| 6,127,784 A | 10/2000 | Grossman et al. | |
| 6,132,072 A | 10/2000 | Turnbull et al. | |
| 6,153,985 A | 11/2000 | Grossman | |
| 6,208,713 B1 | 3/2001 | Ishiguchi | |

(Continued)

FOREIGN PATENT DOCUMENTS

CA      2171244      9/1996

(Continued)

OTHER PUBLICATIONS

U.S. Appl. No. 11/601,295, filed Nov. 17, 2006.

(Continued)

*Primary Examiner* — Douglas W Owens
*Assistant Examiner* — Minh D A
(74) *Attorney, Agent, or Firm* — Burr & Brown (57) ABSTRACT

A lighting device comprising a group of one of more illumination solid state light emitters, a reference solid state light emitter and a reference sensor which detects an intensity of the reference solid state light emitter. Each of the emitters (1) has an illumination which is spaced from a first point by a delta u', v' distance on a 1976 CIR diagram of not more than 0.015, and/or (2) has a forward voltage temperature dependence which is within 5% of a first forward voltage temperature dependence. In addition, a lighting device comprising one or more illumination solid state light emitters, a reference solid state light emitter and a sensor which comprises at least two areas of individual sensors. Also, methods of lighting.

7 Claims, 3 Drawing Sheets

U.S. PATENT DOCUMENTS

| | | |
|---|---|---|
| 6,212,213 B1 | 4/2001 | Weber |
| 6,234,648 B1 | 5/2001 | Borner et al. |
| 6,236,331 B1 | 5/2001 | Dussureault |
| 6,285,139 B1 | 9/2001 | Ghanem |
| 6,292,901 B1 | 9/2001 | Lys et al. |
| 6,335,538 B1 | 1/2002 | Prutchi et al. |
| 6,350,041 B1 | 2/2002 | Tarsa et al. |
| 6,357,889 B1 | 3/2002 | Duggal et al. |
| 6,362,578 B1 | 3/2002 | Swanson et al. |
| 6,411,046 B1 | 6/2002 | Muthu |
| 6,441,558 B1 | 8/2002 | Muthu et al. |
| 6,495,964 B1 | 12/2002 | Muthu et al. |
| 6,498,440 B2 * | 12/2002 | Stam et al. .................. 315/291 |
| 6,510,995 B2 | 1/2003 | Muthu et al. |
| 6,513,949 B1 | 2/2003 | Marshall et al. |
| 6,538,371 B1 | 3/2003 | Duggal et al. |
| 6,550,949 B1 | 4/2003 | Bauer et al. |
| 6,552,495 B1 | 4/2003 | Chang |
| 6,567,881 B1 | 5/2003 | Muthu et al. |
| 6,576,881 B2 | 6/2003 | Muthu et al. |
| 6,576,930 B2 | 6/2003 | Reeh et al. |
| 6,577,073 B2 | 6/2003 | Shimizu et al. |
| 6,608,614 B1 | 8/2003 | Johnson |
| 6,611,000 B2 | 8/2003 | Tamura et al. |
| 6,624,350 B2 | 9/2003 | Nixon et al. |
| 6,630,801 B2 | 10/2003 | Schuurmans |
| 6,633,301 B1 | 10/2003 | Dallas et al. |
| 6,636,003 B2 | 10/2003 | Rahm et al. |
| 6,674,060 B2 | 1/2004 | Antila |
| 6,692,136 B2 | 2/2004 | Marshall et al. |
| 6,740,972 B2 | 5/2004 | Smith et al. |
| 6,741,351 B2 | 5/2004 | Marshall et al. |
| 6,784,463 B2 | 8/2004 | Camras et al. |
| 6,809,347 B2 | 10/2004 | Tasch et al. |
| 6,817,735 B2 | 11/2004 | Shimizu et al. |
| 6,836,083 B2 | 12/2004 | Swanson et al. |
| 6,841,804 B1 | 1/2005 | Chen et al. |
| 6,841,947 B2 | 1/2005 | Berg-johansen |
| 6,857,748 B2 * | 2/2005 | Roddy et al. .................. 353/31 |
| 6,863,402 B2 * | 3/2005 | Roddy et al. .................. 353/31 |
| 6,914,267 B2 | 7/2005 | Fukasawa et al. |
| 6,936,857 B2 | 8/2005 | Doxsee et al. |
| 7,005,679 B2 | 2/2006 | Tarsa et al. |
| 7,008,078 B2 | 3/2006 | Shimizu et al. |
| 7,009,343 B2 | 3/2006 | Lim et al. |
| 7,014,336 B1 | 3/2006 | Ducharme et al. |
| 7,023,543 B2 | 4/2006 | Cunningham |
| 7,066,623 B2 | 6/2006 | Lee et al. |
| 7,093,958 B2 | 8/2006 | Coushaine |
| 7,095,056 B2 | 8/2006 | Vitta et al. |
| 7,135,664 B2 | 11/2006 | Vornsand et al. |
| 7,140,752 B2 | 11/2006 | Ashdown |
| 7,173,384 B2 | 2/2007 | Plotz et al. |
| 7,186,000 B2 | 3/2007 | Lebens et al. |
| 7,202,608 B2 | 4/2007 | Robinson et al. |
| 7,208,713 B2 | 4/2007 | Ishiguchi |
| 7,213,940 B1 | 5/2007 | Van De Ven et al. |
| 7,256,557 B2 | 8/2007 | Lim et al. |
| 7,281,816 B2 | 10/2007 | Suzuki |
| 7,312,927 B2 | 12/2007 | Bogner et al. |
| 7,358,954 B2 | 4/2008 | Negley et al. |
| 7,515,128 B2 * | 4/2009 | Dowling ....................... 345/83 |
| 7,595,784 B2 * | 9/2009 | Yamamoto et al. ........... 345/102 |
| 2001/0035853 A1 | 11/2001 | Hoelen et al. |
| 2002/0070681 A1 | 6/2002 | Shimizu et al. |
| 2002/0070914 A1 | 6/2002 | Bruning et al. |
| 2002/0190972 A1 | 12/2002 | Van de Van |
| 2003/0030063 A1 | 2/2003 | Sosniak et al. |
| 2003/0052594 A1 | 3/2003 | Matsui et al. |
| 2003/0072153 A1 | 4/2003 | Matsui et al. |
| 2003/0089918 A1 | 5/2003 | Hiller et al. |
| 2003/0117798 A1 | 6/2003 | Leysath |
| 2003/0146411 A1 | 8/2003 | Srivastava et al. |
| 2003/0230991 A1 | 12/2003 | Muthu et al. |
| 2004/0021859 A1 | 2/2004 | Cunningham |
| 2004/0062040 A1 | 4/2004 | Blume et al. |
| 2004/0070333 A1 | 4/2004 | Lin et al. |
| 2004/0105261 A1 | 6/2004 | Ducharme et al. |
| 2004/0208210 A1 | 10/2004 | Inoguchi |
| 2004/0212998 A1 | 10/2004 | Mohacsi |
| 2004/0217364 A1 | 11/2004 | Tarsa et al. |
| 2004/0218388 A1 | 11/2004 | Suzuki |
| 2004/0262623 A1 | 12/2004 | You |
| 2004/0264193 A1 | 12/2004 | Okumura |
| 2005/0024834 A1 | 2/2005 | Newby |
| 2005/0052378 A1 | 3/2005 | Hacker |
| 2005/0062446 A1 | 3/2005 | Ashdown |
| 2005/0082974 A1 | 4/2005 | Fukasawa et al. |
| 2005/0099478 A1 | 5/2005 | Iwase |
| 2005/0117334 A1 | 6/2005 | Lee et al. |
| 2005/0259439 A1 | 11/2005 | Cull et al. |
| 2005/0274972 A1 | 12/2005 | Roth et al. |
| 2006/0007553 A1 | 1/2006 | Bogner et al. |
| 2006/0012989 A1 | 1/2006 | Lee et al. |
| 2006/0022616 A1 | 2/2006 | Furukawa et al. |
| 2006/0049781 A1 | 3/2006 | Lee et al. |
| 2006/0105482 A1 | 5/2006 | Alferink |
| 2006/0214174 A1 | 9/2006 | Shirakuma et al. |
| 2006/0221644 A1 | 10/2006 | Kwon et al. |
| 2006/0256049 A1 | 11/2006 | Schou |
| 2007/0040512 A1 | 2/2007 | Jungwirth et al. |
| 2007/0081357 A1 | 4/2007 | Kim et al. |
| 2007/0115228 A1 | 5/2007 | Roberts et al. |
| 2007/0223219 A1 | 9/2007 | Medendorp et al. |
| 2007/0247414 A1 | 10/2007 | Roberts |

FOREIGN PATENT DOCUMENTS

| | | |
|---|---|---|
| DE | 196 08 898 | 10/1999 |
| DE | 10-335077 | 3/2005 |
| DE | 10 2004 023 186 | 12/2005 |
| DE | 20 2005 020 801 | 9/2006 |
| EP | 1 081 771 | 3/2001 |
| EP | 1 152 642 | 4/2001 |
| EP | 1 111 966 | 6/2001 |
| EP | 1 160 883 | 12/2001 |
| EP | 1 548 573 | 12/2003 |
| EP | 1 462 711 | 9/2004 |
| EP | 1 589 519 | 4/2005 |
| EP | 1 564 821 | 8/2005 |
| EP | 1 583 147 | 10/2005 |
| EP | 1 622 427 | 2/2006 |
| EP | 1 628 286 | 2/2006 |
| FR | 2 426 381 | 12/1979 |
| FR | 2 854 252 | 4/2003 |
| JP | 09-199756 | 7/1997 |
| JP | 10-012926 | 1/1998 |
| JP | 10-163535 | 6/1998 |
| JP | 2001-024235 | 1/2001 |
| JP | 2003-515956 | 5/2003 |
| JP | 2003-529889 | 10/2003 |
| JP | 2004-080046 | 3/2004 |
| JP | 2004-103443 | 4/2004 |
| JP | 2004-253309 | 9/2004 |
| JP | 2004-286971 | 10/2004 |
| JP | 2004-356116 | 12/2004 |
| JP | 2004-363055 | 12/2004 |
| JP | 2005-142311 | 6/2005 |
| JP | 2007-141737 | 6/2007 |
| WO | 96/18210 | 6/1996 |
| WO | 98/43014 | 10/1998 |
| WO | 00/19546 | 4/2000 |
| WO | 00/34709 | 6/2000 |
| WO | 00/60562 | 10/2000 |
| WO | 01/41215 | 6/2001 |
| WO | 03/037042 | 5/2003 |
| WO | 2004/032235 | 4/2004 |
| WO | 2004/071141 | 8/2004 |
| WO | 2005/021323 | 3/2005 |
| WO | 2005/124877 | 12/2005 |
| WO | 2006/126124 | 11/2006 |
| WO | PCT/US2006/44519 | 11/2006 |
| WO | 2007/046026 | 4/2007 |
| WO | 2007/061758 | 5/2007 |
| WO | 2007/141748 | 12/2007 |
| WO | 2008/078240 | 7/2008 |

OTHER PUBLICATIONS

U.S. Appl. No. 12/257,804, filed Oct. 24, 2008.
Narendran et al., "Solid State lighting: failure analysis of white LEDs," Journal of Cystal Growth, vol. 268, Issues 1-4, Aug. 2004, Abstract.
Perduijn et al., *Light Output Feedback Solution for RGB LED Backlight Applications*, SID Digest (2000).
Zhu et al., *Optimizing the Performance of Remote Phosphor LED*, First International Conference on White LED's and Solid State Lighting, PW-48 (Nov. 26-30, 2007).
Cree, Inc., "Cree® Xlamp® 7090 XR-E Series LED Binning and Labeling," Application Note: CLD-AP08.000, 7pp (2006).
Perduijn et al., *Light Output Feedback Solution for RGB LED Backlight Applications*, SID Digest (2000).
Van De Ven et al., "Warm White Illumination with High CRI and High Efficacy by Combining 455 nm Excited Yellowish Phosphor LEDs and Red AlInGaP LEDs," First International Conference on White LEDs and Solid State Lighting, Nov. 30, 2007.
Zhu et al., *Optimizing the Performance of Remote Phosphor LED*, First International Conference on White LED's and Solid State Lighting, PW-48 (Nov. 26-30, 2007).
U.S. Appl. No. 11/614,180, filed Dec. 21, 2006.
U.S. Appl. No. 11/613,714, filed Dec. 20, 2006.
U.S. Appl. No. 11/624,811, filed Jan. 19, 2007.
U.S. Appl. No. 11/743,754, filed May 3, 2007.
U.S. Appl. No. 11/751,982, filed May 22, 2007.
U.S. Appl. No. 11/753,103, filed May 24, 2007.
U.S. Appl. No. 11/751,990, filed May 22, 2007.
U.S. Appl. No. 11/736,761, filed Apr. 18, 2007.
U.S. Appl. No. 11/736,799, filed Apr. 18, 2007.
U.S. Appl. No. 11/737,321, filed Apr. 19, 2007.
U.S. Appl. No. 11/948,021, filed Nov. 30, 2007.
U.S. Appl. No. 12/117,280, filed May 8, 2008.
U.S. Appl. No. 11/831,287, filed Jul. 31, 2007.
U.S. Appl. No. 11/751,263, filed May 21, 2007.
U.S. Appl. No. 11/958,721, filed Dec. 18, 2007.
U.S. Appl. No. 11/836,926, filed Aug. 10, 2007.
U.S. Appl. No. 11/674,855, filed Feb. 14, 2007.
U.S. Appl. No. 11/601,500, filed Nov. 17, 2006.
U.S. Appl. No. 11/368,976, filed Mar. 6, 2006.
U.S. Appl. No. 11/601,410, filed Nov. 17, 2006.
U.S. Appl. No. 11/751,364, filed May 21, 2007.
U.S. Appl. No. 11/601,295, filed Nov. 17, 2006.
U.S. Appl. No. 60/990,724, filed Nov. 28, 2007.
U.S. Appl. No. 61/041,404, filed Apr. 1, 2008.
U.S. Appl. No. 61/108,133, filed Oct. 24, 2008.

* cited by examiner

LIGHTING DEVICE WITH COLOR CONTROL, AND METHOD OF LIGHTING

CROSS-REFERENCE TO RELATED APPLICATIONS

This application claims the benefit of U.S. Provisional Patent Application No. 60/809,461, filed May 31, 2006, the entirety of which is incorporated herein by reference.

FIELD OF THE INVENTION

The present invention is directed to a lighting device, more particularly, a lighting device which maintains and/or adjusts the color of light output and the intensity of the light output. In particular, the invention relates to providing such color control in lighting devices which comprise one or more solid state light emitters. The present invention is also directed to a method of lighting which provides color control in lighting devices which comprise one or mote solid state light emitters.

BACKGROUND OF THE INVENTION

A large proportion (some estimates are as high as twenty-five percent) of the electricity generated in the United States each year goes to lighting. Accordingly, there is an ongoing need to provide lighting which is more energy-efficient. It is well-known that incandescent light bulbs are very energy-inefficient light sources—about ninety percent of the electricity they consume is released as heat rather than light. Fluorescent light bulbs are more efficient than incandescent light bulbs (by a factor of about 10) but are still less efficient as compared to solid state light emitters, such as light emitting diodes.

In addition, as compared to the normal lifetimes of solid state light emitters, e.g., light emitting diodes, incandescent light bulbs have relatively short lifetimes, i.e., typically about 750-1000 hours. In comparison, light emitting diodes, for example, have typical lifetimes between 50,000 and 70,000 hours. Fluorescent bulbs have longer lifetimes (e.g., 10,000-20,000 hours) than incandescent lights, but provide less favorable color reproduction.

Color reproduction is typically measured using the Color Rendering Index (CRI Ra). CRI Ra is a modified average of the relative measurements of how the color rendition of an illumination system compares to that of a reference radiator when illuminating eight reference colors, i.e., it is a relative measure of the shift in surface color of an object when lit by a particular lamp. The CRI Ra equals 100 if the color coordinates of a set of test colors being illuminated by the illumination system are the same as the coordinates of the same test colors being irradiated by the reference radiator. Daylight has a high CRI (Ra of approximately 100), with incandescent bulbs also being relatively close (Ra greater than 95), and fluorescent lighting being less accurate (typical Ra of 70-80). Certain types of specialized lighting have very low CRI (e.g., mercury vapor or sodium lamps have Ra as low as about 40 or even lower). Sodium lights are used, e.g., to light highways—driver response time, however, significantly decreases with lower CRI Ra values (for any given brightness, legibility decreases with lower CRI).

Another issue faced by conventional light fixtures is the need to periodically replace the lighting devices (e.g., light bulbs, etc.). Such issues are particularly pronounced where access is difficult (e.g., vaulted ceilings, bridges, high buildings, traffic tunnels) and/or where change-out costs are extremely high. The typical lifetime of conventional fixtures is about 20 years, corresponding to a light-producing device usage of at least about 44,000 hours (based on usage of 6 hours per day for 20 years). Light-producing device lifetime is typically much shorter, thus creating the need for periodic change-outs.

Accordingly, for these and other reasons, efforts have been ongoing to develop ways by which solid state light emitters can be used in place of incandescent lights, fluorescent lights and other light-generating devices in a wide variety of applications. In addition, where light emitting diodes (or other solid state light emitters) are already being used, efforts are ongoing to provide light emitting diodes (or other solid state light emitters) which are improved, e.g., with respect to energy efficiency, color rendering index (CRI Ra), contrast, low cost, efficacy (1 m/W), and/or duration of service.

A variety of solid state light emitters are well-known. For example, one type of solid state light emitter is a light emitting diode.

Light emitting diodes are semiconductor devices that convert electrical current into light. A wide variety of light emitting diodes are used in increasingly diverse fields for an ever-expanding range of purposes.

More specifically, light emitting diodes are semiconducting devices that emit light (ultraviolet, visible, or infrared) when a potential difference is applied across a p-n junction structure. There are a number of well-known ways to make light emitting diodes and many associated structures, and the present invention can employ any such devices. By way of example, Chapters 12-14 of Sze, Physics of Semiconductor Devices, (2d Ed. 1981) and Chapter 7 of Sze, Modern Semiconductor Device Physics (1998) describe a variety of photonic devices, including light emitting diodes.

The expression "light emitting diode" is used herein to refer to the basic semiconductor diode structure (i.e., the chip). The commonly recognized and commercially available "LED" that is sold (for example) in electronics stores typically represents a "packaged" device made up of a number of parts. These packaged devices typically include a semiconductor based light emitting diode such as (but not limited to) those described in U.S. Pat. Nos. 4,918,487; 5,631,190; and 5,912,477; various wire connections, and a package that encapsulates the light emitting diode.

As is well-known, a light emitting diode produces light by exciting electrons across the band gap between a conduction band and a valence band of a semiconductor active (light-emitting) layer. The electron transition generates light at a wavelength that depends on the band gap. Thus, the color of the light (wavelength) emitted by a light emitting diode depends on the semiconductor materials of the active layers of the light emitting diode.

Although the development of light emitting diodes has in many ways revolutionized the lighting industry, some of the characteristics of light emitting diodes have presented challenges, some of which have not yet been fully met.

Because light that is perceived as white is necessarily a blend of light of two or more colors (or wavelengths), no single light emitting diode junction has been developed that can produce white light. "White" LED lamps have been produced which have a light emitting diode pixel formed of respective red, green and blue light emitting diodes. Another "white" LED lamp which has been produced includes (1) a light emitting diode which generates blue light and (2) a luminescent material (e.g., a phosphor) that emits yellow light in response to excitation by light emitted by the light emitting diode, whereby the blue light and the yellow light, when mixed, produce light that is perceived as white light.

In addition, the blending of primary color's to produce combinations of non-primary colors is generally well understood in this and other arts. In general, the 1931 CIE Chromaticity Diagram (an international standard for primary colors established in 1931), and the 1976 CIE Chromaticity Diagram (similar to the 1931 Diagram but modified such that similar distances on the Diagram represent similar perceived differences in color) provide useful reference for defining colors as weighted sums of primary colors.

The CRI Ra of efficient white LED lamps is generally low (in the range 65-75) as compared to incandescent light sources (Ra of 100). Additionally the color temperature for LEDs is generally "cooler" (~5500 K) and less desirable than the color temperature of incandescent or CCFL bulbs (~2700 K). Both of these deficiencies in LEDs can be improved by the addition of other LEDs or lumiphors of selected saturated colors. As indicated above, light sources according to the present invention can utilize specific color "blending" of light sources of specific (x,y) color chromaticity coordinates (see U.S. Patent Application No. 60/752,555, filed Dec. 21, 2005, entitled "Lighting Device and Lighting Method" (inventors: Antony Paul Van de Ven and Gerald H. Negley), the entirety of which is hereby incorporated by reference). For example, light from additional selected saturated sources can be mixed with the unsaturated broad spectrum source(s) to provide uniform illumination without any areas of discoloration; and if desired, for cosmetic reasons, the individual light emitters can be made to be not visible as discreet devices or discreet color areas when the illumination source or aperture is viewed directly.

Light emitting diodes can thus be used individually or in any combinations, optionally together with one or more luminescent material (e.g., phosphors or scintillators) and/or filters, to generate light of any desired perceived color (including white). Accordingly, the areas in which efforts are being made to replace existing light sources with light emitting diode light sources, e.g., to improve energy efficiency, color rendering index (CRI Ra), efficacy (1 m/W), and/or duration of service, are not limited to any particular color or color blends of light.

A wide variety of luminescent materials (also known as lumiphors or luminophoric media, e.g., as disclosed in U.S. Pat. No. 6,600,175, the entirety of which is hereby incorporated by reference) are well-known and available to persons of skill in the art. For example, a phosphor is a luminescent material that emits a responsive radiation (e.g., visible light) when excited by a source of exciting radiation. In many instances, the responsive radiation has a wavelength which is different from the wavelength of the exciting radiation. Other examples of luminescent materials include scintillators, day glow tapes and inks which glow in the visible spectrum upon illumination with ultraviolet light.

Luminescent materials can be categorized as being down-converting, i.e., a material which converts photons to a lower energy level (longer wavelength) or up-converting, i.e., a material which converts photons to a higher energy level (shorter wavelength).

Inclusion of luminescent materials in LED devices has been accomplished by adding the luminescent materials to a clear or substantially transparent encapsulant material (e.g., epoxy-based, silicone-based, glass-based or metal oxide-based material) as discussed above, for example by a blending or coating process.

For example, U.S. Pat. No. 6,963,166 (Yano '166) discloses that a conventional light emitting diode lamp includes a light emitting diode chip, a bullet-shaped transparent housing to cover the light emitting diode chip, leads to supply current to the light emitting diode chip, and a cup reflector for reflecting the emission of the light emitting diode chip in a uniform direction, in which the light emitting diode chip is encapsulated with a first resin portion, which is further encapsulated with a second resin portion. According to Yano '166, the first resin portion is obtained by filling the cup reflector with a resin material and curing it after the light emitting diode chip has been mounted onto the bottom of the cup reflector and then has had its cathode and anode electrodes electrically connected to the leads by way of wires. According to Yano '166, a phosphor is dispersed in the first resin portion so as to be excited with the light A that has been emitted from the light emitting diode chip, the excited phosphor produces fluorescence ("light B") that has a longer wavelength than the light A, a portion of the light A is transmitted through the first resin portion including the phosphor, and as a result, light C, as a mixture of the light A and light B, is used as illumination.

Various types of solid state light emitters degrade over time. For example, it is well-known that light emitting diodes degrade over time. This means that over time, they reduce in brightness, e.g., to half brightness after about 50,000 hours. Different types (colors) of light emitting diodes have different types of degradation mechanisms and different rates of degradation. If a lighting device is made from different types of light emitting diodes which degrade at different rates, as the light emitting diodes degrade, the color of the light emitted by the lighting device changes as the proportions of each of the different types or colors of light emitting diodes changes.

In addition, ambient temperature can cause changes in the color of light emitted from a lighting device which includes one or more solid state light emitter. For example, in general, as ambient temperature increases, the amount of light emitted by light emitting diodes reduces. This is especially significant for red light emitting diodes comprising an AlInGaP material system. Luminance reduction can be as much as 0.5% per 1 degree C. of temperature increase.

In addition, some solid state lighting devices experience degradation due to encapsulate browning. For example, many LEDs degrade over time, generally due to the encapsulate losing its transparency.

It is known to use sensors to monitor light emitted by a lighting device and measure the light's color and luminance, and then adjust the relative intensities of the different color light sources to "balance" the color back to white (or any other particular color, including white light of a particular color temperature) and maintain the required amount of brightness For example, such arrangements have been used in LED video displays and in LCD displays using light emitting diodes as the light emitters.

Accordingly, there is a need for devices and methods by which the color (e.g., the color temperature of white light) of light emitted from a lighting device which includes one or more solid state light emitter can be maintained and/or adjusted even as one or mote different types of solid state light emitters degrade in brightness over time.

BRIEF SUMMARY OF THE INVENTION

The present invention is directed to such devices and methods, i.e., to devices and methods by which the color (e.g., the color temperature of white light) and/or output luminance (or intensity) of light emitted from a lighting device which includes one or more solid state light emitter can be maintained and/or adjusted even as one or more different types of solid state light emitters degrade in brightness over time.

In accordance with the present invention, a subset of the solid state light emitters (e.g., one color type) and a sensor are placed inside the light.

In some embodiments according to the present invention, reference solid state light emitter(s) and corresponding illuminating solid state light emitter(s) is/are mounted on a thermally conductive substrate (i.e., an element with relatively low thermal resistance).

In a first aspect of the present invention, there is provided a lighting device comprising a first group of solid state light emitters, at least one first group reference solid state light emitter and a first reference sensor.

In this aspect of the present invention, the first group of solid state light emitters comprises at least one first group solid state light emitter. The first group solid state light emitter's and the first group reference solid state light emitter (1) each have an illumination which corresponds to a point oil the 1976 CIE diagram which is spaced from a first group point by a distance such that delta u', v' relative to the first group point is not more than 0.015 on the 1976 CIE diagram, and in some cases, not more than 0.010 on the 1976 CIE diagram, and in some cases, not more than 0.005 on the 1976 CIE diagram, and/or (2) each have a forward voltage temperature dependence which is within 5% of a first group forward voltage temperature dependence.

In a second aspect of the present invention, there is provided a method of lighting, comprising:

supplying current of a first current magnitude to a first group of solid state light emitters, supplying current of substantially the first current magnitude to a first group reference solid state light emitter; and detecting an intensity of light from the first group reference solid state light emitter.

In this aspect of the present invention, the first group of solid state light emitters comprises at least one first group solid state light emitter. The first group solid state light emitter(s) and the first group reference solid state light emitter (1) each have an illumination which corresponds to a point on the 1976 CIE diagram which is spaced from a first group point by a distance such that delta u', v' relative to the first group point is not more than 0.015 on the 1976 CIE diagram, and in some cases, not more than 0.010 on the 1976 CIE diagram, and in some cases, not more than 0.005 on the 1976 CIE diagram, and/or (2) each have a forward voltage temperature dependence which is within 5% of a first group forward voltage temperature dependence.

In some embodiments according to this aspect of the present invention, the method further comprises adjusting current supplied to a second group of solid state light emitter's to a second current magnitude, e.g., when the intensity of the first group reference solid state light emitter, as detected by a sensor, has decreased.

In some embodiments according to this aspect of the present invention, the method further comprises sensing the second current magnitude and, if the second current magnitude reaches a particular value (e.g., indicative of the fact that the first group reference solid state light emitter needs to be replaced), emitting a signal.

The invention may be more fully understood with reference to the accompanying drawings and the following detailed description of the invention.

DETAILED DESCRIPTION OF THE INVENTION

As noted above, in various aspects of the present invention, there is provided a lighting device comprising one or more groups of solid state light emitters, at least one reference solid state light emitter for the or each group of solid state light emitters, and a reference sensor for each group.

The expression "group" is used herein to designate solid state light emitters of a particular color or type. That is, where a reference solid state light emitter is referred to as being for a particular group of solid state light emitters, that reference solid state light emitter and those (or that) solid state light emitters are of a particular color or type, i.e., they emit light having color coordinates (e.g., on the 1976 CIE diagram) which is within a specified range. Thus, the benefits of the present invention can be provided, namely, any degradation or reduction of intensity in the solid state light emitters of the color or type will be similarly experienced by the reference solid state light emitter of the same (or similar) color or type, and such degradation or reduction will be accurately and reliably detected by the reference sensor for that group. Likewise, a reference sensor which is referred to as being for a particular group is used to sense the intensity of the light emitted by a reference solid state light emitter of that group.

For each group, the one or more solid state light emitters, and the reference solid state light emitter, each have an illumination which corresponds to a point on the 1976 CIE diagram which is spaced from a first group point by a distance such that delta u', v' relative to the first group point is not more than 0.015 on the 1976 CIE diagram, and in some cases, not more than 0.010 on the 1976 CIE diagram, and in some cases, not more than 0.005 on the 1976 CIE diagram, and/or (2) each have a forward voltage temperature dependence which is within 5% of a first group forward voltage temperature dependence. In some embodiments of the present invention, the one or more solid state light emitters of a particular group and the reference solid state light emitter for that group Where a solid state light emitter (or any other light emitter) is described as being of a particular color (or is described as emitting light of a particular color), such description means that the light emitted from that light emitter corresponds to a particular point on the 1976 CIE diagram (or is within a specific delta u', v' relative to such point, e.g., not more than 0.015, 0.010 or 0.005), i.e., the color from such light emitter can be saturated or unsaturated. The expression "saturated", as used herein, means having a purity of at least 85%, the term "purity" having a well-known meaning to persons skilled in the art, and procedures for calculating purity being well-known to those of skill in the art.

The expression "illumination", as used herein when referring to light emitted from a light emitting diode, means that at least some current is being supplied to the light emitting diode to cause the light emitting diode to emit at least some light. The expression "illumination" encompasses situations where the light emitting diode emits light continuously or intermittently at a rate such that a human eye would perceive it as emitting light continuously, or where a plurality of light emitting diodes of the same color or different colors are emitting light intermittently and/or alternating (with or without overlap in "on" times) in such a way that a human eye would perceive them as emitting light continuously (and, in cases where different colors are emitted, as a mixture of those colors).

Any desired solid state light emitter or emitters can be employed in accordance with the present invention. Persons of skill in the art are aware of, and have ready access to, a wide variety of such emitters. Such solid state light emitters include inorganic and organic light emitters. Examples of types of such light emitters include a wide variety of light emitting diodes (inorganic or organic, including polymer light emitting diodes (PLEDs)), laser diodes, thin film electroluminescent devices, light emitting polymers (LEPs), a variety of each of which are well-known in the art (and therefore it is not necessary to describe in detail such devices, and/or the materials out of which such devices are made).

The light emitters of different groups can be similar to one another, different from one another or any combination (i.e., there can be a plurality of solid state light emitters of one type, or there can be solid state light emitters of each of two or more types)

As noted above, one example of a family of solid state light emitters which can be employed are LEDs. Such LEDs can be selected from among any light emitting diodes (a wide variety of which are readily obtainable and well known to those skilled in the art, and therefore it is not necessary to describe in detail such devices, and/or the materials out of which such devices are made). For instance, examples of types of light emitting diodes include inorganic and organic light emitting diodes, a variety of each of which are well-known in the art. Such devices can include lumiphors, encapsulant, lead frames, and/or any of a wide variety of other structures, each of which are well-known in the art, and persons of skill in the art are readily able to incorporate such elements in the devices. For example, representative examples of LEDs which are suitable for use according to the present invention include those described in U.S. Patent Application No. 60/753,138, filed on Dec. 22, 2005, entitled "Lighting Device" (inventor: Gerald H. Negley), the entirety of which is hereby incorporated by reference, in which light emitting diodes are included in a package together with one or more lumiphors, and the one or more lumiphors are spaced from the one or more light emitting diode to achieve improved light extraction efficiency. Additional representative examples of LEDs which are suitable for use according to the present invention include those described in U.S. Patent Application No. 60/761,310, filed on Jan. 23, 2006, entitled "Shifting Spectral Content in LEDs by Spatially Separating Lumiphor Films" (inventors: Gerald H. Negley and Antony Paul Van de Ven), the entirety of which is hereby incorporated by reference, in which two or more lumiphors are provided, with the lumiphors being spaced from each other. Further representative examples of LEDs (and other solid state light emitting devices) which are suitable for use according to the present invention include those described in: (1) U.S. Patent Application No. 60/808,702, filed on May 26, 2006, entitled "Lighting Device" (inventors: Gerald H. Negley and Antony Paul Van de Ven), the entirety of which is hereby incorporated by reference; (2) U.S. Patent Application No. 60/802,697, filed on May 23, 2006, entitled "Lighting Device and Method of Making" (inventor: Gerald H. Negley), the entirety of which is hereby incorporated by reference; and (3) U.S. Patent Application No. 60/808,925, filed on May 26, 2006, entitled "Solid State Light Emitting Device and Method of Making Same" (inventors: Gerald H. Negley and F. Neal Hunter), the entirety of which is hereby incorporated by reference.

Each group of solid state light emitters can comprise any desired number of solid state emitters.

A wide variety of sensors which can detect the intensity of light from a reference solid state light emitter are well-known and available to those of skill in the art, and any of such sensors can be employed in the devices and methods according to the present invention. For example, pin diodes are well-known sensors which can detect the intensity of light from a reference solid state light emitter (likewise, photovoltaic cells and other devices can be used in their place).

Variation in brightness of a reference solid state light emitter of a particular group due to, e.g., changes in ambient temperature, loss of encapsulant transparency, etc., are detected by the sensor(s), e.g., the pin diode(s), and such decreased brightness is compensated for by a feedback system which allows more current to flow through the solid state light emitters of that group, so as to restore the brightness for that group back to the nominal value.

Sensors, e.g., pin diodes or light emitting diodes, potentially degrade as a result of continuous exposure to heat, UV radiation and/or blue light. In order to prolong the life of the sensors, in some embodiments according to the present invention, the sensors are thermally isolated from a thermally conductive substrate on which solid state light emitters and reference solid state light emitters are mounted, and the sensors optionally can be connected onto a heat sink.

Additionally, as some light emitters (e.g., blue and white LED lamps and light emitters which use LEDs using a phosphor with a blue die) emit some blue light and also some UV radiation, in some embodiments according to the present invention, there is included an optical filter between the emitting face of the reference solid state light emitter(s) and the reference sensor(s), in order to attenuate (or eliminate) the amount of UV and deep blue radiation reaching the reference sensor. In some such embodiments, the optical filter is substantially transparent between 480 nm and 630 nm, while attenuating outside this range—persons of skill in the art are familiar with, and have access to, such optical filters. The expression "substantially transparent", as used herein, means that the structure which is characterized as being substantially transparent allows passage of at least 90% of the light having a wavelength within the range emitted by the solid state light emitter.

In a representative example of an embodiment according to the present invention, two groups, group 1 (blue light emitting diodes with yellow lumiphors) and group 2 (red light emitting diodes) of light emitting diodes are employed, first and second power lines are provided; the first power line includes all of the group 1 light emitting diodes and a group 1 reference light emitting diode arranged in series; and the second power line includes all of the group 2 light emitting diodes and a group 2 reference light emitting diode arranged in series. In such an embodiment, if it is detected that the brightness in the group 1 reference light emitting diode has decreased by a first percentage, the current flowing through the second power line can be decreased in order to compensate for the apparent reduction in brightness of the group 1 emitting diodes. Alternatively, it would be possible to adjust the current in the first power line and/or adjust the current in the second power line in order to adjust the combined color back to a desired hue, without necessarily bringing the overall brightness back to the original brightness. In this arrangement, the sensor can be chosen to selectively detect only light emitted by one of the groups of light emitters or reference light emitters.

Additional groups of solid state light emitters (e.g., a third group of light emitting diodes, e.g., which have a dominant wavelength in the cyan legion, and optionally a fourth group and/or a fifth group, etc.) can be included in the lighting devices, and the color and/or brightness of the emissions from all of the respective groups can be adjusted and/or maintained in an analogous way.

As noted above, additional groups of solid state light emitters can be included in the lighting devices, and the color and/or brightness of the emissions can be adjusted and/or maintained in an analogous way.

As indicated above, in some embodiments according to the present invention, reference solid state light emitter(s) is/are substantially identical in construction to corresponding solid state light emitter(s) in an illuminating part of the lighting device, and they are operated with substantially the same amount of current. In addition, in some embodiments according to the present invention, reference solid state light emitter(s) and corresponding illuminating solid state light emitter(s) is/are both mounted on a thermally conductive substrate (i.e., an element with relatively low thermal resistance), and/or the reference solid state light emitter(s) is/are connected is series with the illuminating solid state light emitter(s). In some embodiments according to the present invention, in order to ensure that the degradation of the reference solid state light emitter(s) matches that of illuminating solid state light emitter(s), the reference solid state light emitting diode(s) are from the same production batch as the corresponding illuminating solid state light emitting diode(s).

The expression "mounted on", as used herein, means that the first structure which is "on" a second structure can be in contact with the second structure, or can be separated from the second structure by one or more intervening structures (each side, of opposite sides, of which is in contact with the first structure, the second structure or one of the intervening structures).

The expression "reference solid state light emitter(s) is/are substantially identical in construction to corresponding solid state light emitter(s) in an illuminating part of the lighting device" means that the reference solid state light emitter(s) and the solid state light emitter(s) comprise the same active layers and, in some cases, (1) all of the elements of the respective light emitters are of the same material, (2) the respective light emitters are made by the same manufacturer, (3) the respective light emitters are from the same batch, (4) the respective light emitters each have an illumination which corresponds to a point on the 1976 CIE diagram which is spaced from a first point by a distance such that delta u', v' relative to the first point is not more than 0.015 on the 1976 CIE diagram, and in some cases, not more than 0.010 on the 1976 CIE diagram, and in some cases, not more than 0.005 on the 1976 CIE diagram, and/or (5) the respective light emitters each have a forward voltage temperature dependence which is within 5% of a first forward voltage temperature dependence.

The expression "operated with substantially the same amount of current" means that the respective current amounts differ, if at all, by not more than 5%, or that the currents are proportional in that a percentage variation in the one current is matched with a percentage in the other by not more than plus or minus 5% (and if the power input to a fixture is decreased by a particular amount, e.g., 50%, the respective current amounts would still not differ by more than 5%).

In some embodiments according to the present invention, one or more reference solid state light emitters (of a particular group) and one or more corresponding reference sensors (for that group) are positioned within a reference chamber which is substantially isolated from light emitted by any element other than that (or those) one or more reference solid state light emitter.

In some such embodiments, the reference chamber is highly non-absorbent. Persons of skill in the art are familiar with, have access to, and can make a wide variety of such chambers. For example, such chambers can comprise an integrating sphere (such are well-known to persons skilled in the art), and/or can include walls coated with (or constructed of) the material marketed by Furukawa (a Japanese corporation) under the trademark MCPET®, paper loaded with $TiO_2$, barium sulfate or various ceramic formulations.

As noted above, in some embodiments according to the present invention, there is provided at least one UV light reducing element which is positioned between one or mole reference solid state light emitter of a particular group and the one or more corresponding reference sensor for that group, whereby if UV light is emitted by the reference solid state light emitter(s), the intensity of UV light reaching the reference sensor is reduce (relative to the intensity of the UV light emitted by the reference solid state light emitter). Persons of skill in the art are familiar with and have access to a wide variety of such UV light reducing elements. In some such embodiments, the UV light reducing element (or optical filter) is substantially transparent between 480 nm and 630 nm, while attenuating outside this range—persons of skill in the art are familiar with, and have access to, such elements.

In some embodiments according to the present invention, one or more reference sensor is mounted on a sensor mounting structure. Persons of skill in the art are familiar with a variety of structures which can be used for such mounting structures. In some such embodiments, the sensor mounting structure is thermally isolated from heat generated by (non-reference) solid state light emitters of the one or more groups.

In some embodiments according to the present invention, there is provided at least one heat dissipating structure which is in thermal communication with at least one reference sensor. Persons of skill in the art are familiar with a variety of heat dissipating structures and materials, and can readily select an appropriate structure and material. For example, the heat dissipating structure can comprise one or more protrusions (e.g., fins). In some such embodiments, one or more reference sensor is mounted on a sensor mounting structure, and the heat dissipating structure is mounted on the sensor mounting structure.

In some embodiments according to the present invention, a first reference sensor and a second reference sensor (which may be isolated from the first reference sensor) are both mounted on a single sensor mounting structure.

In some embodiments according to the present invention, a first reference sensor is mounted on a first side of a sensor mounting structure and a heat dissipating structure is mounted on a second side of the sensor mounting structure. In some such embodiments, the first side of the sensor mounting structure is opposite to the second side of the sensor mounting structure.

In some embodiments according to the present invention, one (or more) reference solid state light emitter is mounted on an emitter mounting structure and one (or more) corresponding solid state light emitter is also mounted on the emitter mounting structure. In some such embodiments, the reference solid state light emitter is mounted on a first side of the emitter mounting structure and the solid state light emitter is mounted on a second side of the emitter mounting structure (in some such devices, the first side of the emitter mounting structure is opposite to the second side of the emitter mounting structure).

Persons of skill in the art are familiar with a variety of materials which are suitable for use as the emitter mounting structure. In some embodiments, the emitter mounting structure has a relatively low thermal resistance, e.g., not greater than 500 degrees C./W.

The lighting devices of the present invention can be arranged, mounted and supplied with electricity in any desired manner, and can be mounted on any desired housing or fixture. Skilled artisans are familiar with a wide variety of arrangements, mounting schemes, power supplying apparatuses, housings and fixtures, and any such arrangements, schemes, apparatuses, housings and fixtures can be employed in connection with the present invention. The lighting devices of the present invention can be electrically connected (or selectively connected) to any desired power source, persons of skill in the art being familiar with a variety of such power sources.

In some embodiments according to the present invention, power is supplied to the one or more solid state light emitters and/or the one or more reference solid state light emitter via one or more power lines.

For example, a representative embodiment according to the present invention includes a first group of solid state light emitters, a second group of solid state light emitters, a first group reference solid state light emitter and a second group reference solid state light emitter. The device includes a first power line and a second power line. The first power line is directly or selectively electrically connected to a first number of the first group of solid state light emitters and a second number of the second group of solid state light emitters. For example, all of the first group of solid state light emitters and the first group reference solid state light emitter can be electrically connected to the first power line (with none of the second group of solid state light emitters and the second group reference solid state light emitter electrically connected to the first power line), and all of the second group of solid state light emitters and the second group reference solid state light emitter can be electrically connected to the second power line (with none of the first group of solid state light emitters and the first group reference solid state light emitter electrically connected to the second power line).

A statement herein that two components are "electrically connected," e.g., that a power line is directly or selectively electrically connected to one or more solid state light emitting diodes means that current can be supplied to the solid state light emitting diodes via the power line (or, a statement that a lighting device of the present invention is electrically connected (or selectively connected) to any desired power source means that current can be supplied from the power supply to the lighting device. The word "selectively" in the above expressions indicates that the electrical connection can selectively be broken, e.g., by opening a switch in the power line. Either expression, i.e., "electrically connected" or "selectively electrically connected" encompasses devices in which a switch or other device can be adjusted to adjust the magnitude of current flowing into the device or a portion of the device, i.e., not merely turning power on or off.

Representative examples of arrangements of lighting devices, schemes for mounting lighting devices, apparatus for supplying electricity to lighting devices, housings for lighting devices, fixtures for lighting devices and power supplies for lighting devices, all of which are suitable for the lighting devices of the present invention, are described in U.S. Patent Application No. 60/752,753, filed on Dec. 21, 2005, entitled "Lighting Device" (inventors: Gerald H, Negley, Antony Paul Van de Ven and Neal Hunter), the entirety of which is hereby incorporated by reference, and in U.S. Patent Application No. 60/798,446, filed on May 5, 2006, entitled "Lighting Device" (inventor: Antony Paul Van de Ven), the entirety of which is hereby incorporated by reference.

In some embodiments of lighting devices according to the present invention, there is further included one or mote current limiting device which limits the maximum amount of current that can be put through the (or each of the) solid state light emitters in order to prevent or avoid overheating or catastrophic failure. Such current limiting devices can be positioned in each of a plurality of power lines connected to multiple solid state light emitters, or can be positioned in a power line which feeds a plurality of individual power lines connected to respective solid state light emitters. Persons of skill in the art are familiar with a variety of components, e.g., resistors, which can be employed to limit current, and any such components can be employed in the devices according to the present invention.

In some embodiments of lighting devices according to the present invention, there is further included at least one current sensor which (or each of which) senses a current being supplied to one or more of the solid state light emitters. As indicated above, through the passage of time, the solid state light emitters have a tendency to undergo a reduction in brightness. In accordance with the present invention, such reductions are detected and accurately compensated for, in many cases by increasing the current supplied to the affected solid state light emitter(s). By sensing the current being supplied to one or mole of the solid state light emitters, it is possible to detect when one or more of such solid state light emitters is requiring such an elevated current that it would be advisable, for one or more reason, to replace that (or those) solid state light emitter(s). In some embodiments according to the present invention, there is further provided a signaling element which provides a signal if such a sensed current reaches a threshold value (i.e., is at least a minimum current value) which is indicative of it being advisable to replace the appropriate solid state light emitter(s).

The lighting devices according to the present invention can include a single group of solid state light emitters which emit light having a dominant wavelength of any desired color, and/or can include a plurality of groups of solid state light emitters of different colors and/or of different correlated color temperatures. In addition, any other light emitters can additionally be included in the lighting devices according to the present invention. Further, the lighting devices according to the present invention can be used in combination with any other desired lighting device(s) including light emitters of any type (i.e., including incandescent lighting, fluorescent lighting, etc.).

As indicated above, lighting devices according to the present invention can provide all or part of the light involved in color "blending" of light sources, e.g., of desired (x,y) color chromaticity coordinates. For example, lighting devices according to the present invention can be used to provide all or part of the light involved in the blending described in:

(1) U.S. Patent Application No. 60/752,555, filed Dec. 21, 2005, entitled "Lighting Device and Lighting Method" (inventors: Antony Paul Van de Ven and Gerald H. Negley), the entirety of which is hereby incorporated by reference);

(2) U.S. Patent Application No. 60/793,524, filed Apr. 20, 2006, entitled "Lighting Device and Lighting Method" (inventors: Antony Paul Van de Ven and Gerald H. Negley), the entirety of which is hereby incorporated by reference);

(3) U.S. Patent Application No. 60/793,518, filed Apr. 20, 2006, entitled "Lighting Device and Lighting Method" (inventors: Antony Paul Van de Ven and Gerald H. Negley), the entirety of which is hereby incorporated by reference);

(4) U.S. Patent Application No. 60/793,530, filed Apr. 20, 2006, entitled "Lighting Device and Lighting Method" (inventors: Antony Paul Van de Ven and Gerald H. Negley), the entirety of which is hereby incorporated by reference);

(5) U.S. Pat. No. 7,213,940, issued on May 8, 2007, entitled "LIGHTING DEVICE AND LIGHTING METHOD" (inventors: Antony Paul van de Ven and Gerald H. Negley), the entirety of which is hereby incorporated by reference; and (6) U.S. Patent Application No. 60/868,134, filed on Dec. 1, 2006, entitled "LIGHTING DEVICE AND LIGHTING METHOD" (inventors: Antony Paul van de Ven and Gerald H. Negley), the entirety of which is hereby incorporated by reference.

Additional representative examples of specific combinations of colors include:

(7) lighting devices including yellowish-white light emitting diode lamps and red light emitting diodes;

(8) lighting devices including greenish-white light emitting diode lamps and red light emitting diodes;

(9) lighting devices including white light emitting diode lamps, cyan light emitting diodes and red light emitting diodes; and (10) lighting devices including red light emitting diodes, green light emitting diodes and blue light emitting diodes.

The expression "lighting device" as used herein is not limited, except that it is capable of emitting light. That is, a lighting device can be a device which illuminates an area or volume (e.g., a room, a swimming pool, a warehouse, an indicator, a road, a vehicle, a road sign, a billboard, a ship, a boat, an aircraft, a stadium, a tree, a window, a yard, etc.), an indicator light, or a device or array of devices that illuminate an enclosure, or a device that is used for edge or back-lighting (e.g., back light poster, signage, LCD displays), or any other light emitting device.

The present invention further relates to an illuminated enclosure (the volume of which can be illuminated uniformly or non-uniformly), comprising an enclosed space and at least one lighting device according to the present invention, wherein the lighting device illuminates at least a portion of the enclosure (uniformly or non-uniformly).

As noted above, in a second aspect of the present invention, there is provided a method of lighting, comprising:

supplying current of a first current magnitude to a first group of solid state light emitters, supplying current of substantially the first current magnitude to a first group reference solid state light emitter, and detecting an intensity of light from the first group reference solid state light emitter.

The expression "supplying current of substantially the first current magnitude" means that the magnitude of the current differs, if at all, from the first current magnitude by not more than 5%, or that the currents are proportional in that a percentage variation in the one current is matched with a percentage in the other by not more than plus or minus 5% (and if the power input to a fixture is decreased by a particular amount, e.g., 50%, the respective current amounts would still not differ by more than 5%).

In this aspect of the present invention, the first group of solid state light emitters comprises at least one first group solid state light emitter. The first group solid state light emitter(s) and the first group reference solid state light emitter (1) each have an illumination which corresponds to a point on the 1976 CIE diagram which is spaced from a first group point by a distance such that delta u', v' relative to the first group point is not more than 0.015 on the 1976 CIE diagram, and in some cases, not more than 0.010 on the 1976 CIE diagram, and in some cases, not more than 0.005 on the 1976 CIE diagram, and/or (2) each have a forward voltage temperature dependence which is within 5% of a first group forward voltage temperature dependence.

In some embodiments according to this aspect of the present invention, the method further comprises adjusting current supplied to the second group of solid state light emitters and to the second group reference solid state light emitter to a second current magnitude, e.g., when the intensity of the first group reference solid state light emitter, as detected by a sensor, has decreased.

In some embodiments according to this aspect of the present invention, the method further comprises sensing the second current magnitude and, if the second current magnitude reaches a particular value (e.g., indicative of the fact that the first group reference solid state light emitter needs to be replaced), emitting a signal.

In an aspect of the present invention, there is provided a lighting device which comprises at least a first group of solid state light emitters and a second group of solid state light emitters (each group comprising at least one solid state light emitter) at least one first group reference solid state light emitter and at least one second group reference solid state light emitter. In this aspect of the present invention, the first group reference solid state light emitter and the second group reference solid state light emitter produce a combined reference illumination which is detected by a first group-second group combined illumination reference sensor. In this aspect, at least one of the sensors in the device senses a combination of different groups (colors) of solid state light emitters. For example, in some embodiments, there are provided fixtures which combine red LEDs and YGW (yellow-green-white) LED lamps in a single group (a "pink" string of LEDs) controlled by the same current as well as other groups (strings) of substantially the same color. In this case, the associated reference LED group should contain at least one each of the different types (colors) of LEDs. In older to ensure that the proportion of light from each color of LED in the reference group is equal to the proportion of the colors in the illuminating group, an attenuating filter (e.g., a neutral gray color) can be provided for at least one of the LED types in the reference group. The combination of the attenuated lights of one type and the light of a second type impinges onto the sensor and is representative of the luminance and color of the light being emitted as illumination by the illuminating group.

Figure 1:
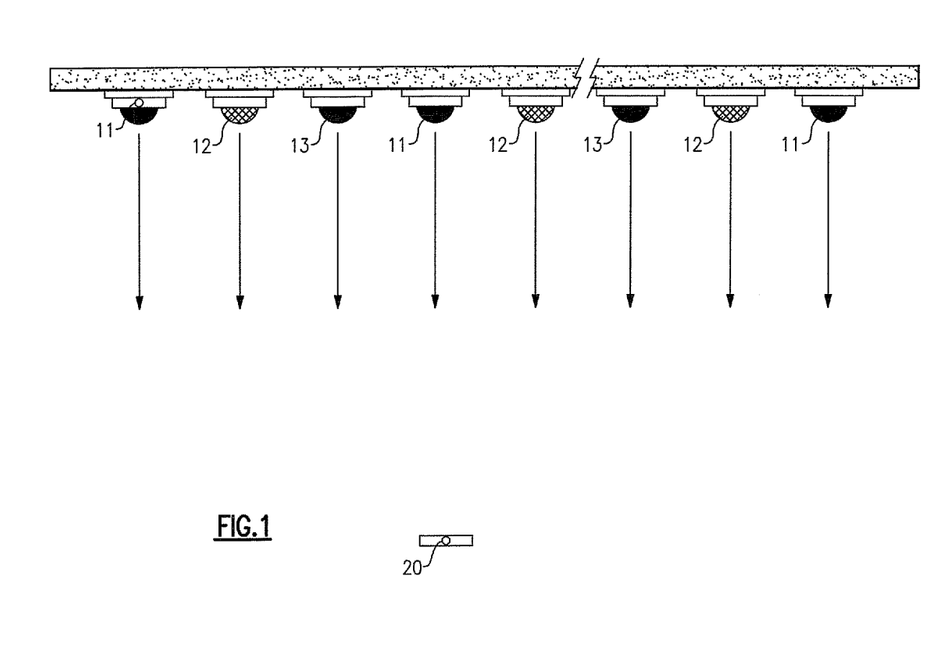
FIG. 1 depicts a first embodiment of a lighting device 10 according to the present invention.

FIG. 1 depicts a first embodiment of a lighting device 10 according to the present invention. Referring to FIG. 1, the lighting device 10 includes a plurality of first group solid state light emitters 11 (LEDs of a first dominant wavelength), a plurality of second group solid state light emitters 12 (LEDs of a second dominant wavelength) and a plurality of third group solid state light emitters 13 (LEDs of a third dominant wavelength). The lighting device 10 further includes a first reference sensor 20.

Figure 2:
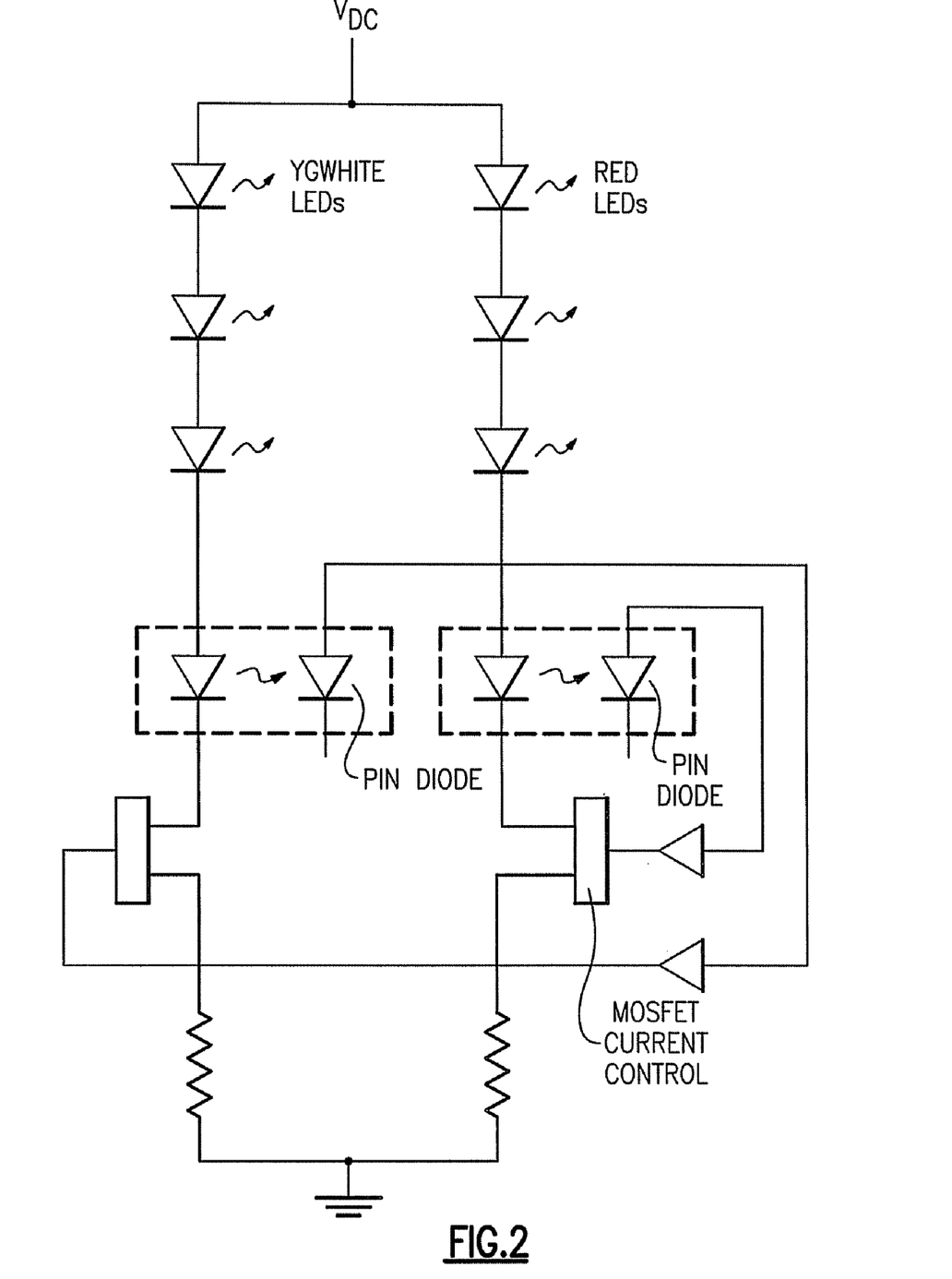
FIG. 2 is an electrical schematic diagram of a second embodiment according to the present invention.

FIG. 2 is an electrical schematic diagram of a first embodiment according to the present invention.

Figure 3:
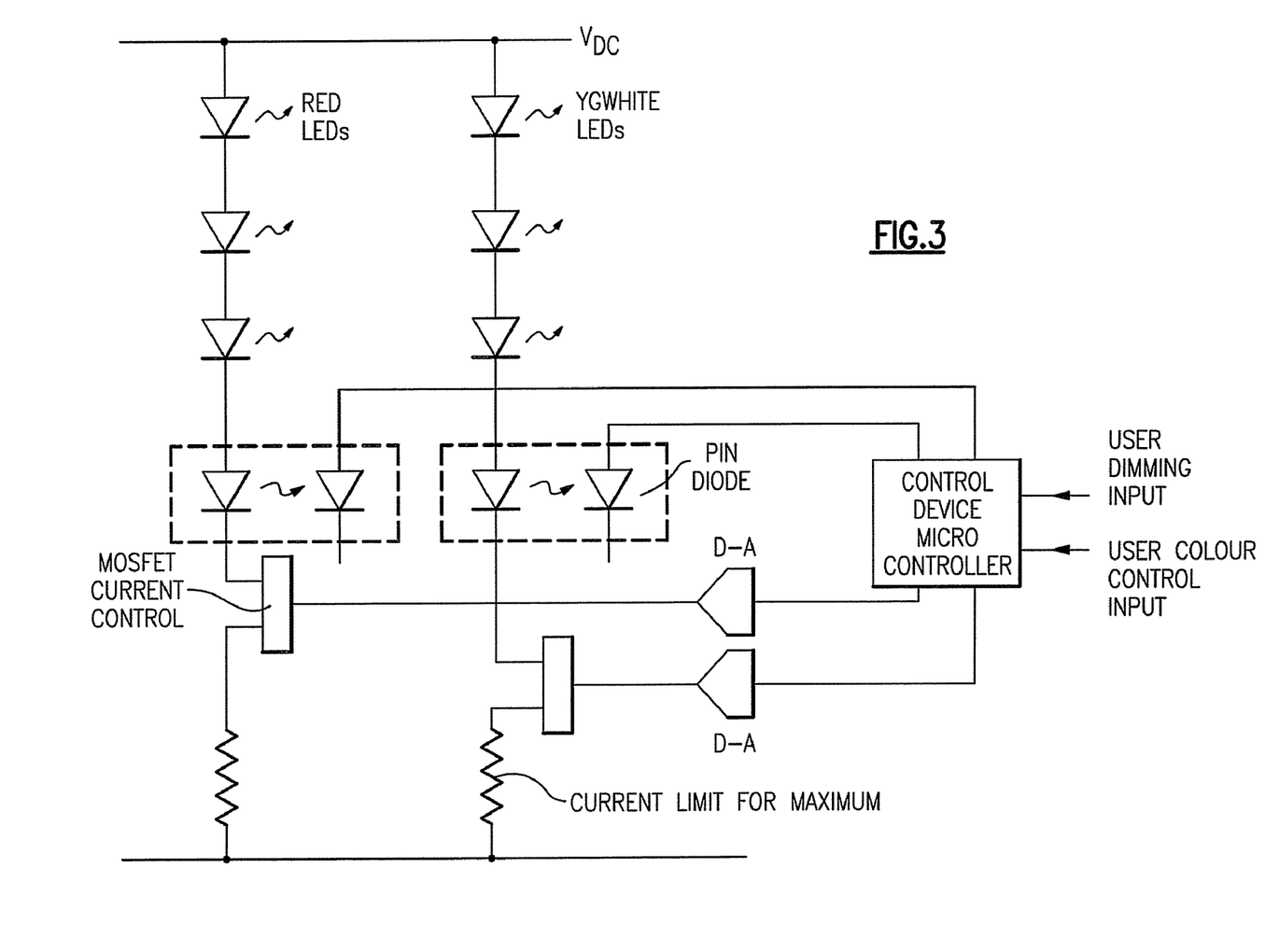
FIG. 3 is an electrical schematic diagram of a third embodiment according to the present invention.

FIG. 3 is an electrical schematic diagram of a second embodiment according to the present invention.

Any two or more structural parts of the lighting devices described herein can be integrated. Any structural part of the lighting devices described herein can be provided in two or more parts (which are held together, if necessary). Similarly, any two or more functions can be conducted simultaneously, and/or any function can be conducted in a series of steps.

The invention claimed is:

1. A lighting device comprising:
a first group of solid state light emitters, said first group of solid state light emitters comprising at least one solid state light emitter, said first group of solid state light emitters (1) having an illumination which corresponds to a point on a 1976 CIE diagram which is spaced from a first group point by a distance such that delta u', v' relative to the first group point is not more than 0.015 on said 1976 CIE diagram, and/or (2) having a forward voltage temperature dependence which is within 5% of a first group forward voltage temperature dependence;
at least one first group reference solid state light emitter, said first group reference solid state light emitter (1) having an illumination which corresponds to a point on said 1976 CIE diagram which is spaced from said first group point by a distance such that delta u', v' relative to said first group point is not more than 0.015 on said 1976 CIE diagram, and/or (2) having a forward voltage temperature dependence which is within 5% of said first group forward voltage temperature dependence; and
a first reference sensor which detects an intensity of said first group reference solid state light emitter.

2. A device as recited in claim 1, further comprising at least one other light emitter.

3. A method of lighting, comprising:
supplying current of a first magnitude to a first group of solid state light emitters, said first group of solid state light emitters comprising at least one solid state light emitter, each of said first group of solid state light emitters (1) having an illumination which corresponds to a point on a 1976 CIE diagram which is spaced from a first group point by a distance such that delta u', v' relative to the first group point is not more than 0.015 on said 1976 CIE diagram, and/or (2) having a forward voltage temperature dependence which is within 5% of a first group forward voltage temperature dependence;
supplying current of substantially said first magnitude to a first group reference solid state light emitter, said first group reference solid state light emitter (1) having an illumination which corresponds to a point on said 1976 CIE diagram which is spaced from said first group point by a distance such that delta u', v' relative to said first group point is not more than 0.015 on said 1976 CIE diagram, and/or (2) having a forward voltage temperature dependence which is within 5% of said first group forward voltage temperature dependence; and
detecting an intensity of light from said first group reference solid state light emitter.

4. A method as recited in claim 3, further comprising adjusting current supplied to said first group of solid state light emitters and to said first group reference solid state light emitter to a second magnitude.

5. A method as recited in claim 4, further comprising sensing said second magnitude.

6. A method as recited in claim 3, further comprising supplying current of a second magnitude to a second group of solid state light emitters, said second group of solid state light emitters comprising at least one solid state light emitter, each of said second group of solid state light emitters (1) having an illumination which corresponds to a point on said 1976 CIE diagram which is spaced from a second group point by a distance such that delta u', v' relative to said second group point is not more than 0.015 on said 1976 CIE diagram, and/or (2) having a forward voltage temperature dependence which is within 5% of a second group forward voltage temperature dependence;
supplying current of substantially said second magnitude to a second group reference solid state light emitter, said second group reference solid state light emitter (1) having an illumination which corresponds to a point on said 1976 CIE diagram which is spaced from said second group point by a distance such that delta u', v' relative to said second group point is not more than 0.015 on said 1976 CIE diagram, and/or (2) having a forward voltage temperature dependence which is within 5% of said second group forward voltage temperature dependence.

7. A method as recited in claim 3, further comprising reducing an intensity of UV light reaching a first reference sensor from said first group reference solid state light emitter.

* * * * *